United States Patent [19]

Yamaguchi

[11] Patent Number: 5,054,414

[45] Date of Patent: Oct. 8, 1991

[54] HOLLOW RUBBER FENDER

[75] Inventor: Tetsuo Yamaguchi, Kobe, Japan

[73] Assignee: Sumitomo Rubber Industries, Kobe, Japan

[21] Appl. No.: 519,262

[22] Filed: May 2, 1990

Related U.S. Application Data

[63] Continuation of Ser. No. 391,680, Aug. 7, 1989, abandoned, which is a continuation of Ser. No. 277,441, Nov. 28, 1988, abandoned, which is a continuation of Ser. No. 158,063, Feb. 12, 1988, abandoned, which is a continuation of Ser. No. 37,058, Apr. 13, 1987, abandoned, which is a continuation of Ser. No. 919,572, Oct. 15, 1986, abandoned, which is a continuation of Ser. No. 837,879, Mar. 6, 1986, abandoned, which is a continuation of Ser. No. 471,232, Mar. 2, 1983, abandoned.

[30] Foreign Application Priority Data

Mar. 20, 1982 [JP] Japan ................................. 57-40181

[51] Int. Cl.⁵ ............................................. B63B 59/02
[52] U.S. Cl. ................................... 114/219; 405/212; 267/140
[58] Field of Search ..................... 114/219; 267/140; 405/215, 212; 14/76; 293/102, 143

[56] References Cited

U.S. PATENT DOCUMENTS

| | | | |
|---|---|---|---|
| 3,690,280 | 9/1972 | Narabu | 114/219 |
| 3,948,500 | 4/1976 | Korbuly et al. | 114/219 |
| 3,999,497 | 12/1976 | Hamel | 267/140 |
| 4,277,055 | 7/1981 | Yamaguchi et al. | 267/140 |
| 4,319,539 | 3/1982 | Fujii et al. | 405/215 |
| 4,433,942 | 2/1984 | Russell et al. | 405/215 |

Primary Examiner—Ed Swinehart
Attorney, Agent, or Firm—Burns, Doane, Swecker & Mathis

[57] ABSTRACT

Herein disclosed is a hollow rubber fender for absorbing kinetic energy of a ship approaching a quay. The fender comprises a substantially funnel-shaped frustoconical hollow support portion made of an elastic rubber material; a buffer portion being generally in a cylindrical form and extending from the smaller-diameter end of the support portion substantially in parallel with the longitudinal axis of the support portion; and a mounting portion extending outwardly and integrally from the larger-diameter end of the support portion along a radial plane perpendicular to the longitudinal axis of the support portion; the inside diameter $r_1$ of the larger-diameter end of the support portion and the outside diameter $r_2$ of the top end of the buffer portion being determined to satisfy the condition of $r_1 \geq r_2$.

7 Claims, 1 Drawing Sheet

HOLLOW RUBBER FENDER

This application is a continuation of application Ser. No. 07/391,680, filed Aug. 7, 1989; which is a continuation of Ser. No. 277,441, filed Nov. 28, 1988, which is a continuation of Ser. No. 158,063, filed Feb. 12, 1988, which is a continuation of Ser. No. 037,058, filed Apr. 13, 1987, which is a continuation of Ser. No. 919,572, filed Oct. 15, 1986, which is a continuation of Ser. No. 837,879, filed Mar. 6, 1986, which is a continuation of Ser. No. 471,232, filed Mar. 2, 1983, all now abandoned.

BACKGROUND OF THE INVENTION

The present invention broadly relates to a fender for ships and, more particularly, to an improvement in a hollow rubber fender of the type having a hollow frusto-conical elastic body made of rubber adapted to be fixed to a quay wall such that the axis of the body extends perpendicularly to the plane of the quay wall.

The present inventor has proposed, in Japanese Utility Model Publication NO. 55299/1981, a rubber fender which is improved to increase the energy absorption power of conventional bowl-shaped fenders. More specifically, this fender comprises a frusto-conical hollow main body and a thick-walled disc-shaped buffer portion projecting from the smaller-diameter end of the main body coaxially with the latter. The thick-walled buffer portion projects from the smaller-diameter end of the hollow frusto-conical main body by a considerable height, e.g. by an axial length of 0.15 H for axial length H of the main body. In operation, this buffer portion is made to contact with the ship's side earlier than the other portions of the fender to effectively absorb a part of the inertia of the large mass of the ship to be moored. Thus a considerably long time is required until the main body is inflated to bring its outer surface into contact with the ship's side. As a consequence, the deformable part of the main body is increased to offer a remarkable increase in the energy absorption power thereof.

Although the rubber fender of the prior art exhibits a high energy absorbing performance, it is so stiff that the fender exerts a considerably high reaction force to the ship's wall when it is in contact therewith. Thus, there is a risk that the ship's wall may be damaged by the rubber fender.

SUMMARY OF THE INVENTION

It is therefore an object of the present invention to provide a rubber fender which exerts a low reaction force while maintaining a high energy absorbing performance, thereby overcoming the defects of the aforementioned prior art.

To this end, according to the invention, there is provided a hollow rubber fender for absorbing kinetic energy of a ship approaching a quay. The fender includes a substantially funnel-shaped frusto-conical hollow support portion made of an elastic rubber material; a buffer portion being generally in a cylindrical form and extending from the smaller-diameter end of said support portion substantially in parallel with the longitudinal axis of said support portion; and a mounting portion extending integrally from the larger-diameter end of said support portion along a radial plane perpendicular to the longitudinal axis of said support portion. The inside diameter $r_1$ of the larger-diameter end of said buffer portion and the outside diameter $r_2$ of said buffer portion are established to satisfy the condition $r_1 \geq r_2$.

According to an embodiment of the present invention, the outer surface of the buffer portion is inclined inwardly at an angle not greater than 10° with respect to the longitudinal axis of the fender. The inner surface of the buffer portion may also be inclined to the longitudinal axis. In such a case, the buffer portion may consist of a revolution body of a wall inclined with respect to the axis of revolution.

According to a further embodiment of the present invention, wherein said mounting portion extends inwardly and integrally from the larger-diameter end of said support portion along a radial plane perpendicular to the longitudinal axis of said support portion, the inside diameter $r_3$ of the mounting portion is established to satisfy the condition $r_3 \geq 0.75 r_2$.

Generally speaking, the present invention is based on the following finding:

Provided that the total energy absorbing performance is maintained at a same level, it is preferred to minimize the reaction force exerted by contact with the ship's wall, because a lower reaction force correspondingly decreases the possibility of damaging the ship's side. The required total energy absorbing performance can be obtained if the amount of deformation of the fender is increased to compensate for the reduction in the reaction force.

Other objects, features and advantages of the invention will become clear from the following description of the embodiments of the present invention taken in conjuction with the accompanying drawings.

DESCRIPTION OF THE PREFERRED EMBODIMENTS

Figure 1:
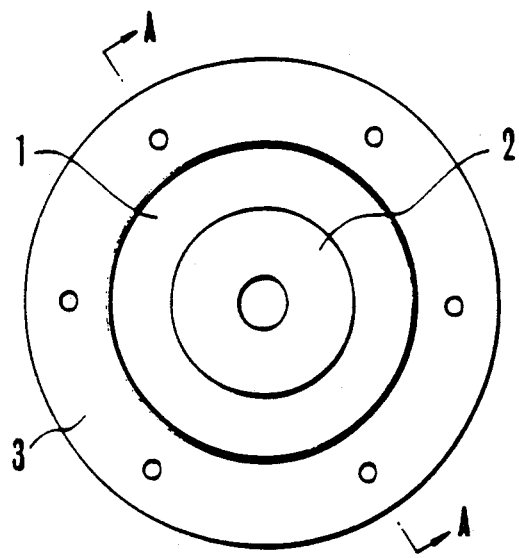
FIG. 1 is a top elevational view of a rubber fender in accordance with an embodiment of the invention.
Figure 2:
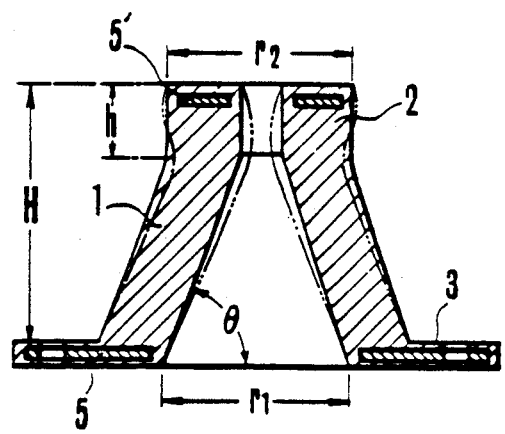
FIG. 2 is a sectional view taken along the line A—A of FIG. 1.

Referring first to FIGS. 1 and 2 which are, respectively, a top elevational view and a sectional view of a hollow rubber fender in accordance with an embodiment of the invention, the fender includes a hollow frusto-conical support portion 1, a cylindrical buffer portion 2 extending integrally from the smaller-diameter end of the support portion 1 coaxially with the latter, and a mounting portion 3 extending integrally from the larger-diameter end of the support portion 1 along a radial plane perpendicular to the axis of the latter.

The inside diameter $r_1$ of the larger-diameter end of the support portion 1 is determined in relation to the outside diameter $r_2$ of the buffer portion 2 so as to meet the condition of $r_1 \geq 1.0 r_2$. Namely, the inside diameter $r_1$ of the larger-diameter end of the support portion 1 is selected to be equal to or greater than the outside diameter $r_2$ of the buffer portion 2. With this arrangement, the region P—P' where the contact pressure load is applied is always positioned at the inner side of a plane Y—Y' passing the support points Q,Q' at the bottom of the support portion 1 during the deformation of the fender, that is, from the beginning of the period of application of the load until the end of the deformation at which the deformed support portion 1 comes into contact with the ship's side. As a consequence, the generation of excessively large reaction forces is avoided advantageously.

Figure 4:
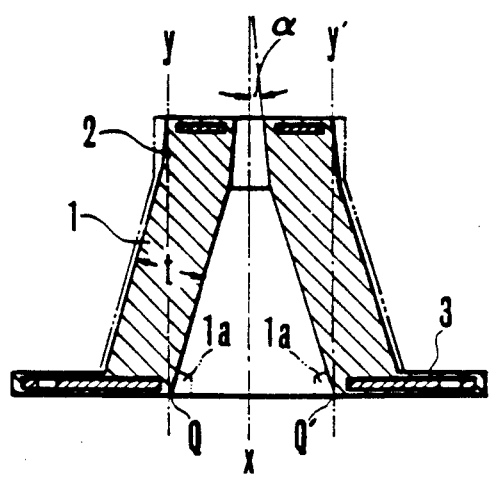
FIG. 4 is a sectional view of a rubber fender in accordance with another embodiment of the the invention.

In another embodiment shown in FIG. 4, the mounting portion 3 includes a heel-like portion 1a formed to integrally project radially inwardly from the larger-diameter end of the support portion 1 as indicated by broken line. In such a case, the inner diameter $r_3$ of the heel-like portion or flange 1a and the outer diameter $r_2$ of the top end of the buffer portion 2 are preferably selected to meet the condition of $r_3 \geqq 0.75 r_2$.

Furthermore, since the buffer portion 2 of the fender of the invention is generally in a cylindrical form, the fender is deformed in the initial period of application of load by the ship's side approaching the quay such that the boundary portion between the buffer portion 2 and the support portion 1 is contracted towards the axis. As a consequence, the angle $\theta$ of inclination of the buffer portion 1 is decreased. In other words, the inclination of the buffer portion 1 with respect to the axis line is increased, so that the initial reaction force exerted by the fender is decreased correspondingly. The results of an experiment indicate that about a 10% decrease of reaction force is attained by the adoption of the cylindrical buffer portion. In the fender shown in FIG. 1, the outside diameter $r_2$ of the buffer portion 2 is determined in relation to the overall height H of the fender. More specifically, the outside diameter $r_2$ equals to 1.27 H.

Figure 3:
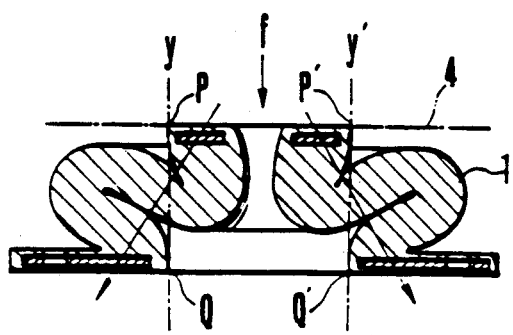
FIG. 3 is a sectional view of the fender shown in FIG. 1 in a state deformed by compression.

After making the initial compression deformation in which the reaction force rises comparatively moderately as explained above, the fender of this embodiment starts to make a bending deformation in which the support portion 1 expands radially outwardly. Finally, the support portion 1 is buckled such that the inner surface of the upper end portion makes contact with the inner surface of the lower end portion thereof as shown in FIG. 3. In this state, however, the outer surface of the buckled support portion 1 does not contact yet with the ship's side 4 because the buffer portion 2 projects from the smaller-diameter end of the support portion 1 in the axial direction by a considerable axial height. This makes, in combination with the structural feature that the inside diameter $r_1$ of the larger-diameter end of the support portion 1 is greater than the outside diameter $r_2$ of the buffer portion 2, the line (f) of force run in the oblique direction as indicated by arrows in FIG. 3. This permits the buckled buffer portion 2 to be further deformed in the radial direction.

In this embodiment, since the buffer portion 2 has a cylindrical form, the support portion 1 can be inclined to a greater extent so that the force (f) acts to further deform the buffer portion 2 radially outwardly. According to the results of a test conducted by the present inventors, about a 10% increase of the deformation amount was achieved by the above-explained deforming action. In the fender of the described embodiment, about a 10% increase of deformation amount is achieved simultaneously with about a 10% reduction in the reaction force. A calculation in accordance with a theoretical formula using these values showed that about a 2% increase in the energy absorption is achieved in the fender of the described embodiment. Thus, the described embodiment affords the design of a fender which exhibits lower reaction force without being accompanied by a reduction in the energy absorption. The numerical values of reaction force, deformation amount and energy absorption mentioned before are only illustrative and are varied by changes in sizes of various parts of the fender.

As will be understood from the foregoing description, according to the invention, it is preferred that the buffer portion 2 has a generally cylindrical form and that the cylindrical buffer portion 2 projects from the smaller-diameter end of the support portion 1 in a direction parallel to the axis by a considerable height. The results of an experiment showed that the projection height (h) of the buffer portion is preferably determined in relation to the overall height (H) of the fender to meet the following condition.

about 0.15 H $\geqq$ h $\geqq$ about 0.35 H

Figure 5:
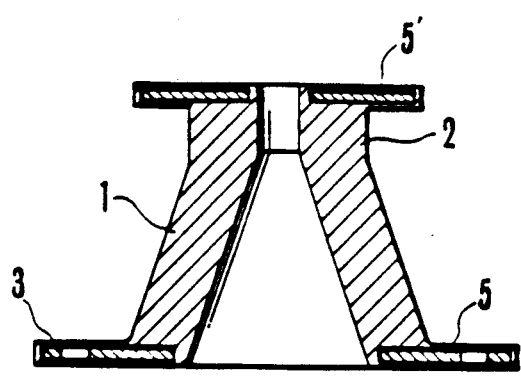
FIG. 5 is a sectional view of a fender in accordance with still another embodiment of the invention.

A reinforcing iron plate 5 is embedded in the mounting portion 3. Also, a reinforcing iron plate 5' is embedded as required in the top end of the buffer portion 2. This reinforcing iron plate 5' serves not only as a stiffener for imparting rigidity to the buffer portion 2 but also as a base for attaching a buffer plate of a large area to the top of the buffer portion 2. The reinforcing plates may be constructed as shown in FIG. 5.

Figure 6:
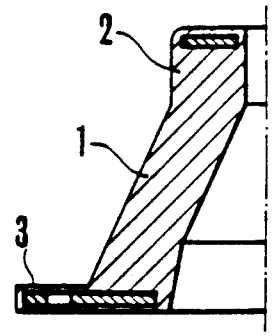
FIG. 6 is a partial sectional view of a fender in accordance with a further embodiment of the invention.

FIG. 6 shows another embodiment of the invention in which the inner surface of the support portion 1 presents an outwardly bending portion located closer to the larger-diameter end of the support portion 1 and spaced by a suitable distance from the bottom surface of the fender. By so doing, it is possible to ensure that the bending deformation occurs always at the bent portion of the support portion 1.

FIG. 4 shows in section a cylindrical fender in accordance with another embodiment of the invention. As described in the above, this fender is distinguished from the fender of the first embodiment in that the buffer portion 2 is inclined inwardly at an angle of 10° with respect to the longitudinal axis of the fender. Other portions are materially identical to those of the first embodiment.

This specific structural feature of the buffer portion is adopted for the reason explained hereinunder.

According to the invention, it is preferred that the inside diameter $r_1$ of large-diameter end of the support portion 1 is equal to or greater than the outside diameter $r_2$ of the buffer portion 2. However, when the wall thickness (t) of the support portion 1 is increased as shown by broken lines to increase the reaction force within the allowable range, the outside diameter $r_2$ of the buffer portion 2 may exceed the inside diameter $r_1$ of larger-diameter end of the support portion 1. To avoid such an inconvenience, in this embodiment of the invention, the inner peripheral surface of the buffer portion 2 is inclined at about 10° to the axis. By so doing, it is possible to make the outside diameter $r_2$ of the buffer portion 2 smaller than the inside diameter $r_1$ of larger-diameter end of the support portion 1 at least at the top surface of the buffer portion 2. Furthermore, in the fender of the invention, the buffer portion 2 is deformed to reduce its diameter when subjected to a compression load. The outside diameter $r_2$ of the buffer portion 2, therefore, satisfies the condition of $r_1 \geqq 1.0 r_2$. In this embodiment of the invention, both the outer peripheral surface and the inner peripheral surface of the buffer portion 2 are inclined with respect to the axis (x). This, however, is not exclusive and it suffices only that the outer peripheral surface of the buffer portion 2 is inclined.

As has been described, according to the invention, it is possible to obtain a hollow rubber fender which exhibits a smaller reaction force yet achieves higher energy absorbing performance.

Although the invention has been described in specific terms, it is to be noted that the described embodiment is only illustrative and various changes and modifications may be imparted thereto without departing from the spirit or scope of the invention as defined in the appended claims.

What is claimed is:

1. A hollow rubber fender for absorbing kinetic energy of a ship approaching a quay comprising:

a substantially funnel-shaped frusto-conical hollow support portion including a small-diameter end and a large-diameter end and being made of an elastic rubber material, said small-diameter end having a first inside diameter and a first outside diameter and said large-diameter end having a second inside diameter $r_1$ and a second outside diameter, a buffer portion having a generally hollow cylindrical form defining a buffer portion inside diameter and a buffer portion outside diameter $r_2$ and extending from said small-diameter end of said support portion in a direction substantially parallel to a longitudinal axis of said support portion, said buffer portion inside diameter being equal to said first inside diameter, said buffer portion having an inner surface inclined with respect to an inner surface of the support portion and an outer surface inclined with respect to an outer surface of the support portion, and a mounting portion extending outwardly and integrally from said large-diameter end of said support portion along a radial plane perpendicular to the longitudinal axis of said support portion, said second inside diameter $r_1$ of the large-diameter end of said support portion and said buffer portion outside diameter $r_2$ being determined to satisfy the condition of $$r_1 \geq r_2$$

and a height h of said buffer portion as measured along a longitudinal axis of said fender being determined in relation to an axial length H of the fender to satisfy the condition wherein h is in the range of about 0.15 H to about 0.35 H, said buffer portion having an outer surface that is substantially parallel to the longitudinal axis of the fender.

2. A hollow rubber fender for absorbing kinetic energy of a ship approaching a quay comprising:

a substantially funnel-shaped frusto-conical hollow support portion including a small-diameter end and a large diameter end and being made of an elastic rubber material, said small-diameter end having a first inside diameter and a first outside diameter and said large diameter end having a second inside diameter $r_1$ and a second outside diameter, a buffer portion having a generally frusto-conical hollow form including a small-diameter buffer end and a large diameter buffer end, said buffer portion extending from said small-diameter end of said support portion in a direction substantially parallel to a longitudinal axis of said support portion, said small-diameter buffer end having a buffer portion outside diameter $r_2$ and said large diameter buffer end having a buffer portion inside diameter, said buffer portion having an inner surface that is inclined with respect to an inner surface of said frusto-conical hollow support portion and an outer surface that is inclined with respect to an outer surface of said frusto-conical hollow support portion, said buffer portion inside diameter being equal to said first inside diameter of said support portion, and a mounting portion extending outwardly and integrally from said large-diameter end of said support portion along a radial plane perpendicular to the longitudinal axis of said support portion, said second inside diameter of said large-diameter end of said support portion and said buffer portion outside diameter being determined to satisfy the condition of $$r_1 \geq r_2$$

and a height h of said buffer portion as measured along a longitudinal axis of said fender being determined in relation to an axial length H of the fender to satisfy the condition wherein h is in the range of about 0.15 H to about 0.35 H, said buffer portion including an outer surface which is inclined inwardly at an angle not greater than 10° to the longitudinal axis of the fender.

3. A hollow rubber fender according to claim 1, wherein said mounting portion extends inwardly and integrally from the large-diameter end of said support portion along a radial plane perpendicular to the longitudinal axis of said support portion, said mounting portion having an inside diameter $r_3$ which satisfies the condition $r_3 \geq 0.75 r_2$.

4. A hollow rubber fender according to claim 1, wherein said buffer portion includes a reinforcing element embedded in a position remote from said support portion.

5. A hollow rubber fender according to claim 4, wherein said reinforcing element comprises a buffer plate in a ring from having an outside diameter larger than said first outside diameter.

6. A hollow rubber fender according to claim 1, wherein said mounting portion includes a reinforcing element embedded therein.

7. A hollow rubber fender according to claim 1, wherein the inner surface of said support portion presents an outwardly bending configuration at a position close to the large-diameter end of said support portion.

* * * * *